United States Patent
Kishore

(12) 
(10) Patent No.: US 8,352,956 B1
(45) Date of Patent: Jan. 8, 2013

(54) CALCULATING AN ESTIMATED TIME REMAINING FOR COMPLETION OF A MULTI-PHASED AND MULTI-THREADED PROCESS

(75) Inventor: Uday Kishore, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1012 days.

(21) Appl. No.: 12/364,239

(22) Filed: Feb. 2, 2009

(51) Int. Cl.
*G06F 9/00* (2006.01)

(52) U.S. Cl. .................................. 718/106; 718/101

(58) Field of Classification Search .................. None
See application file for complete search history.

(56) References Cited

U.S. PATENT DOCUMENTS

| | | | | |
|---|---|---|---|---|
| 6,275,987 | B1 * | 8/2001 | Fraley et al. | 717/127 |
| 6,639,687 | B1 * | 10/2003 | Neilsen | 358/1.14 |
| 7,363,450 | B1 * | 4/2008 | Fedorova | 711/167 |
| 7,475,358 | B2 * | 1/2009 | Anzelde et al. | 715/772 |
| 7,512,895 | B2 * | 3/2009 | Snover et al. | 715/772 |
| 7,577,632 | B2 * | 8/2009 | Thompson et al. | 706/47 |

* cited by examiner

*Primary Examiner* — Eric Coleman
(74) *Attorney, Agent, or Firm* — Harrity & Harrity, LLP

(57) ABSTRACT

A device initializes a total time estimate for a multi-phased and multi-threaded process, determines task information for a currently executing phase of the process, and determines time information for the currently executing phase of the process. The device also calculates an updated total time estimate for the process based on the task information and the time information for the currently executing phase of the process, and displays the updated total time estimate to a user associated with the device.

26 Claims, 11 Drawing Sheets

FIG. 5

| Process Phase | Expected Success Rate For Phase | Number Of Tasks Per Iteration | Time Expected Per Successful Task |
|---|---|---|---|
| 1 | 0.04 | 10 | 5 seconds |
| 2 | 0.10 | 15 | 2 minutes |
| 3 | 0.50 | 20 | 20 seconds |

CALCULATING AN ESTIMATED TIME REMAINING FOR COMPLETION OF A MULTI-PHASED AND MULTI-THREADED PROCESS

BACKGROUND

Some computer-related processes (e.g., a device discovery process for a network, such as a telecommunication network) include several sequential phases, where each phase involves multiple tasks that are executed concurrently. If the tasks in one phase of a process are successfully executed, tasks in a subsequent phase of the process may be prepared for execution. Each phase of the process may include a different number of threads (e.g., a portion of a program that executes tasks) for executing the tasks of the phase. Tasks in different phases of the process may include different timeouts. It may useful for a user associated with the process (e.g., a network administrator, a computing device user, etc.) to know the progress of the process and/or how much more time remains before execution of the process is complete. However, estimating the time remaining for such processes is complicated because there are different phases, there are different thread pool sizes for different phases, different phases have different timeouts (e.g., specified periods of time that will be allowed to elapse in a system before specified events are to take place), and/or the phases may wait for a real time notification or response (e.g., from another process in the network).

Some processes that provide remaining time information include a computer operating system that presents a time remaining for copying files and/or folders from one location to another location, and a computer download manager that presents a time remaining for downloading files (e.g., from the Internet) to a local hard drive. Such processes utilize multiple threads. For example, such processes may split the file(s) being copied or downloaded into multiple chunks, and utilize multiple threads to copy or download the multiple chunks. However, there are no phases involved in such processes, and timeouts are not utilized in such processes (e.g., except for a generic transmission control protocol/Internet protocol (TCP/IP) timeout).

SUMMARY

According to one aspect, a device may include a memory to store a plurality of instructions, and a processor to execute instructions in the memory to initialize a total time estimate for a multi-phased and multi-threaded process, and determine task information for a currently executing phase of the process. The processor may also execute instructions in the memory to determine time information for the currently executing phase of the process, calculate an updated total time estimate for the process based on the task information and the time information for the currently executing phase of the process, and display the updated total time estimate to a user associated with the device.

According to another aspect, a computer-readable memory device may store computer-executable instructions and may include one or more instructions to initialize a total time estimate for a multi-phased and multi-threaded process, one or more instructions to determine task information for a currently executing phase of the process, and one or more instructions to determine time information for the currently executing phase of the process. The computer-readable memory device may also include one or more instructions to calculate an updated total time estimate for the process based on the task information and the time information for the currently executing phase of the process, and one or more instructions to display the updated total time estimate to a user.

According to still another aspect, a computing device-implemented method may include initializing, via a processor associated with the computing device, a total time estimate for a multi-phased and multi-threaded process, determining, via the processor, task information for a currently executing phase of the process, and determining, via the processor, time information for the currently executing phase of the process. The method may also include calculating, via the processor, an updated total time estimate for the process based on the task information and the time information for the currently executing phase of the process, displaying, via a display associated with the computing device, the updated total time estimate to a user associated with the computing device, and determining, via the processor, whether the process includes a next phase. When it is determined that the process includes a next phase, the method may include determining, via the processor, task information for the next phase of the process, determining, via the processor, time information for the next phase of the process, calculating, via the processor, a further updated total time estimate for the process based on the task information and the time information for the next phase of the process, and displaying, via the display, the further updated total time estimate to the user.

According to a further aspect, a system may include means for initializing a total time estimate for a multi-phased and multi-threaded process, means for determining task information for a currently executing phase of the process, means for determining time information for the currently executing phase of the process, and means for calculating an updated total time estimate for the process based on the task information and the time information for the currently executing phase of the process. The system may also include means for displaying the updated total time estimate to a user associated with the system, means for determining that the process includes a next phase, means for determining task information for the next phase of the process, means for determining time information for the next phase of the process, means for calculating a further updated total time estimate for the process based on the task information and the time information for the next phase of the process, and means for displaying the further updated total time estimate to the user.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 depicts a diagram of a portion of an exemplary database capable of being provided in and/or generated by the user device illustrated in FIG. 1;

DETAILED DESCRIPTION

The following detailed description refers to the accompanying drawings. The same reference numbers in different drawings may identify the same or similar elements. Also, the following detailed description does not limit the invention.

Systems and/or methods described herein may calculate an estimated time remaining for completion of a multi-phased and multi-threaded process. For example, in one implementation, the systems and/or methods may initialize a total time estimate for a multi-phased and multi-threaded process, and may determine task information and time information for a currently executing phase of the process. The systems and/or methods may calculate the total time estimate based on the task and time information for the currently executing phase, and may determine if the process includes another (or a next) phase. If the process doe not include a next phase, the systems and/or methods may display the total time estimate to a user. If the process includes a next phase, the systems and/or methods may determine task information and time information for the next phase, and may calculate the total time estimate based on the task and time information for the next phase. The systems and/or methods may repeat the aforementioned steps for all subsequent phases of the process.

As used herein, the term "user" is intended to be broadly interpreted to include a user device or a user of a user device.

Exemplary Arrangement

Figure 1:
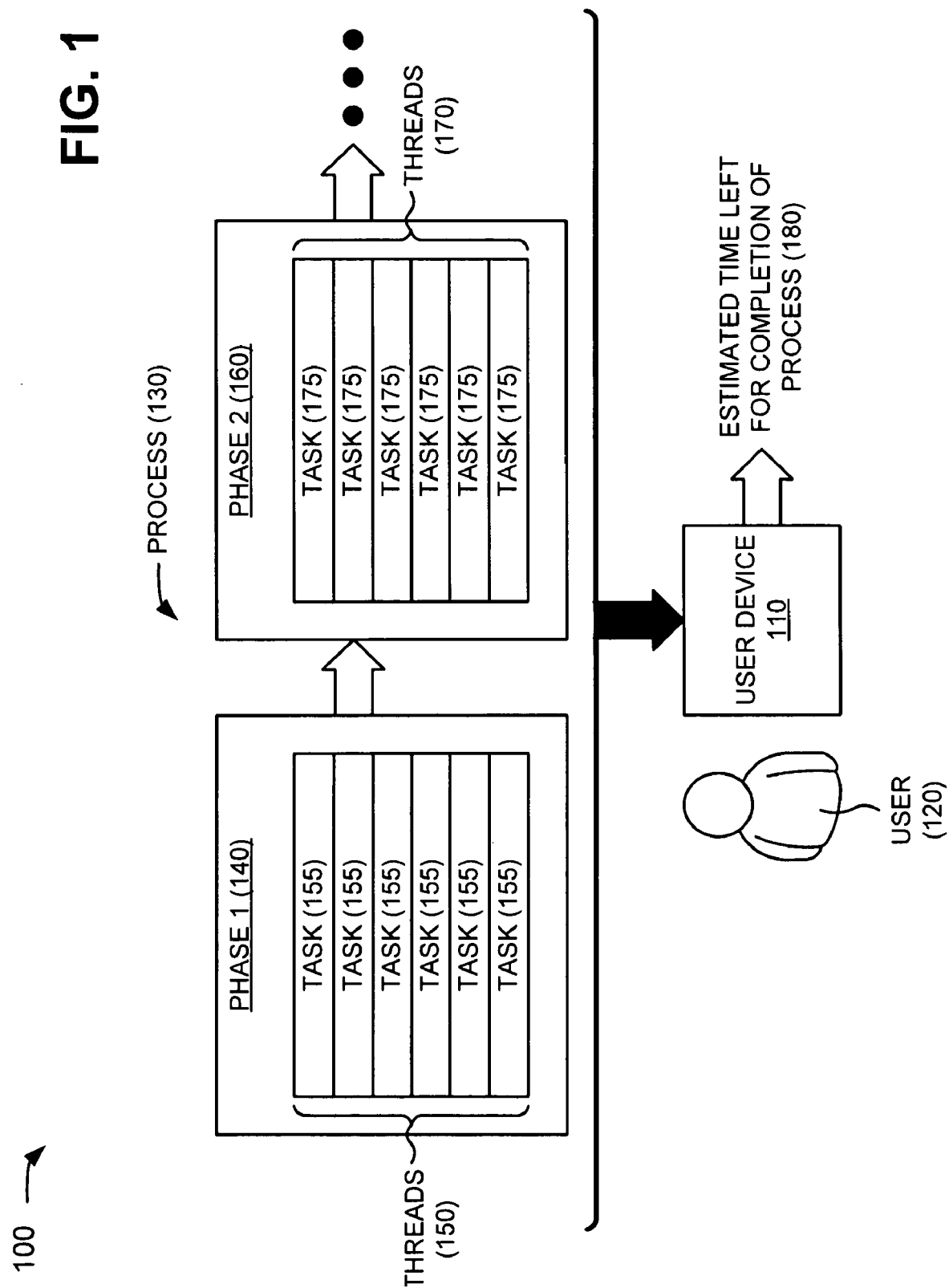
FIG. 1 depicts a diagram of an exemplary arrangement in which systems and/or methods described herein may be implemented.

FIG. 1 depicts a diagram of an exemplary arrangement 100 in which systems and/or methods described herein may be implemented. As illustrated, arrangement 100 may include a user device 110 associated with a user 120 and a process 130. A single user device 110, user 120, and process 130 have been illustrated in FIG. 1 for simplicity. In practice, there may be more user devices 110, users 120, and/or processes 130.

User device 110 may include any device that is capable of receiving information associated with process 130, executing process 130, etc. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a network device (e.g., a gateway, a router, a switch, a firewall, a network interface card (NIC), a hub, a bridge, a proxy server, etc.) or other types of computation or communication devices, threads or processes running on these devices, and/or objects executable by these devices. In one implementation, user device 110 may include a network manager device that receives information associated with a network process (e.g., process 130), and estimates a time remaining for completion of the network process.

User 120 may include a network manager, a network administrator, etc. if user device 110 estimates a time remaining for completion of process (e.g., process 130) implemented by a network. As used herein, a "network" may include a local area network (LAN), a wide area network (WAN), a metropolitan area network (MAN), a telephone network, such as the Public Switched Telephone Network (PSTN), an intranet, the Internet, or a combination of networks. User 120 may also include any person associated with user device 110 whether or not user device 110 estimates a time remaining for completion of process implemented by a network.

Process 130 may include a multi-phased and multi-threaded process. In one implementation, process 130 may include one or more sequential phases, where each phase involves one or more tasks that may be executed concurrently. If the tasks in one phase of process 130 are successfully executed, tasks in a subsequent phase of process 130 may be prepared for execution. Each phase of process 130 may include a different number of threads for executing the tasks of the phase. Each phase of process 130 may include a different timeout, and/or tasks in different phases of process 130 may include different timeouts. Process 130 may be executed by user device 110, may be executed by a device (or devices) other than user device 110 but may be monitored by user device 110, and/or may be executed by user device 110 in combination with another device (or devices). Each phase of process 130 may be completely executed prior to execution of the next phase of process 130. Thus, tasks may not be concurrently executed in more than one phase of process 130 at a time. Rather, tasks may be executed in the same phase of process 130 at any given point in time. In one example, process 130 may include a device discovery process, as described below in connection with FIG. 6.

As further shown in FIG. 1, process 130 may include a first phase 140 and one or more threads 150 for executing one or more tasks 155. First phase 140 of process 130 may be executed prior to execution of the next phase of process 130. In one example, if process 130 is a device discovery process, first phase 140 may include a "ping" operation that uses Internet control message protocol (ICMP) to test Internet connections. Threads 150 may concurrently execute tasks 155. If first phase 140 includes a "ping" operation, for example, one or more of tasks 155 may include an operation that uses ICMP to test a particular Internet connection (e.g., an Internet connection associated with a particular IP address).

Once first phase 140 of process 130 is executed, a second phase 160 of process 130 may be executed. As shown in FIG. 1, second phase 160 may include one or more threads 170 for executing one or more tasks 175. Second phase 160 of process 130 may be executed prior to execution of the next phase of process 130. In one example, if process 130 is a device discovery process, second phase 140 may include a "query" operation that uses simple network management protocol (SNMP) to communicate with network devices (e.g., a gateway, a router, a switch, a firewall, a network interface card (NIC), a hub, a bridge, a proxy server, etc.). Threads 170 may concurrently execute tasks 175. If second phase 160 includes a "query" operation, for example, one or more of tasks 175 may include an operation that uses SNMP to communicate with a particular network device (e.g., to provide information to or obtain information from the particular network device). Once second phase 160 of process 130 is executed, a next phase of process 130 may be executed. Although FIG. 1 only shows two phases for process 130, in other implementations, process 130 may contain fewer, different, differently arranged, or additional phases than depicted in FIG. 1.

As further shown in FIG. 1, user device 110 may receive (e.g., if process 130 is executed externally to user device 110) and/or determine (e.g., if process 130 is executed by user device 110) information associated with process 130. For example, user device 110 may receive and/or determine task information and/or time information associated with process 130. The task information associated with process 130 may include one or more of a number of pending tasks in a currently executing phase of process 130; an expected success rate for the currently executing phase; an expected number of tasks among the pending tasks that will succeed in the currently executing phase; a number of tasks per iteration (i.e., a number of tasks that can execute concurrently) in the currently executing phase; a number of prospective tasks in a next phase of process 130; an expected success rate for the next phase; an expected number of tasks that will succeed in the next phase; a number of tasks per iteration (i.e., a number of tasks that can execute concurrently) in the next phase; etc. The time information associated with process 130 may include one or more of an expected time per successful task in the currently executing phase; an elapsed time in a current iteration; a time remaining for the currently executing phase; an expected time per task in the next phase; an estimated time for the next phase; etc.

User device 110 may utilize the task information and/or the time information associated with process 130 to determine an estimated time (t) 180 remaining for completion of process 130. In one example, user device 110 may set estimated time (t) 180 to an initial value (e.g., t=0), may determine estimated time (t) 180 based on the task information and/or the time information associated with a currently executing phase of process 130, and may display estimated time (t) 180 to user 120. In another example, if user device 110 determines there is a next phase of process 130, user device 110 may determine estimated time (t) 180 based on the task information and/or the time information associated with a next phase of process 130, and may display estimated time (t) 180 to user 120. Estimated time 180 may provide an indication of whether or not process 130 is executing properly. In one example, estimated time 180 may not increase, may consistently decrease, and/or may decrease whenever some tasks failed in one phase of process 130. When calculating estimated time 180, user device 110 may factor in a timeout value, rather than an average time, within each phase.

Exemplary User Device Configuration

Figure 2:
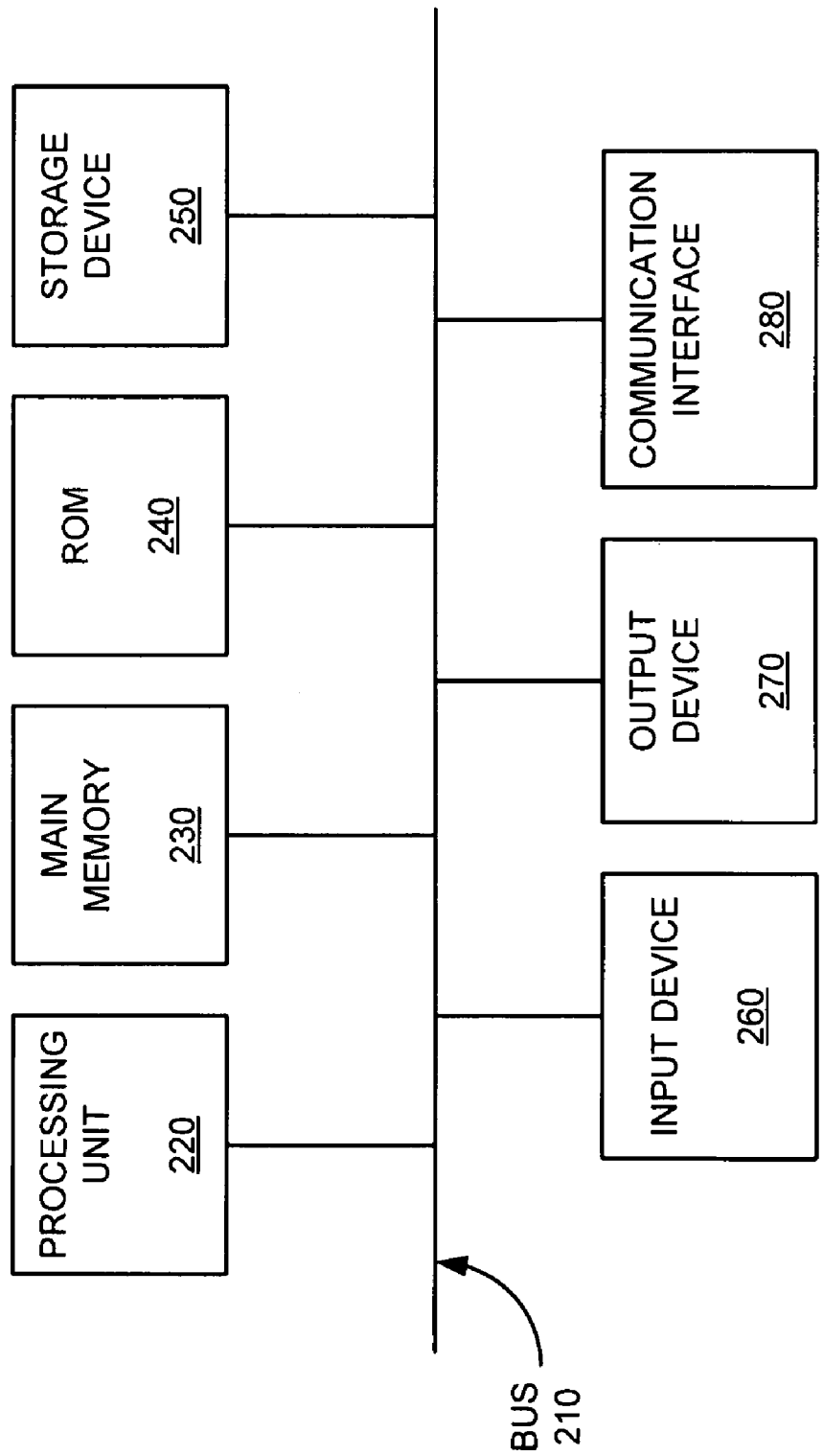
FIG. 2 illustrates a diagram of exemplary components of a user device depicted in FIG. 1.

FIG. 2 illustrates a diagram of exemplary components of a device 200 that may correspond to user device 110. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Exemplary Computer-Readable Medium

Figure 3:
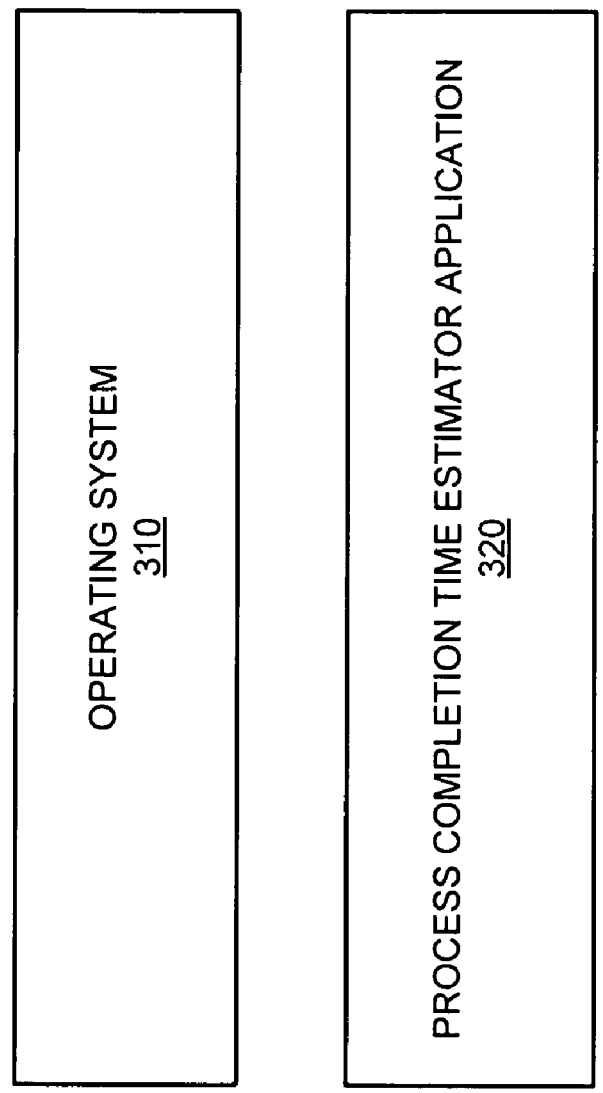
FIG. 3 depicts a diagram of a portion of an exemplary computer-readable medium that may be used by the user device illustrated in FIG. 1.

FIG. 3 depicts a diagram of a portion of an exemplary computer-readable medium 300 that may be used by user device 110. In one implementation, computer-readable medium 300 may correspond to main memory 230, ROM 240, and/or storage device 250 of device 200. The portion of computer-readable medium 300 illustrated in FIG. 3 may include an operating system 310 and a process completion time estimator application 320.

Operating system 310 may include operating system software, such as the Microsoft Windows, Apple MAC OS, Linux, Unix, IBM OS/2, and/or other types of operating systems capable of use user devices or other types of computation or communication devices.

Process completion time estimator application 320 may be included in operating system 310 or may be separate from operating system 310. For example, in one implementation, process completion time estimator application 320 may be a process separate from operating system 310. In this implementation, process completion time estimator application 320 may be provided on a device (e.g., user device 110) that is separate from a device that includes operating system 310, but may interact with operating system 310.

Process completion time estimator application 320 may include an executable object or process. User device 110 may obtain the executable object or process from another device or from a disk, tape, network, CD-ROM, etc. Alternatively, the executable object or process may be pre-installed on user device 110. Process completion time estimator application 320 may perform any of the functions described herein as being performed by user device 110 (e.g., by functional components of user device 110 described below in connection with FIG. 4). Process completion time estimator application 320 may be automatically activated upon initiation of operating system 310. Alternatively, process completion time estimator application 320 may be activated when instructed by a user. In either case, process completion time estimator application 320 may calculate an estimated time remaining for completion of a multi-phased and multi-threaded process (e.g., process 130), as described herein.

Exemplary User Device Operations

Figure 4:
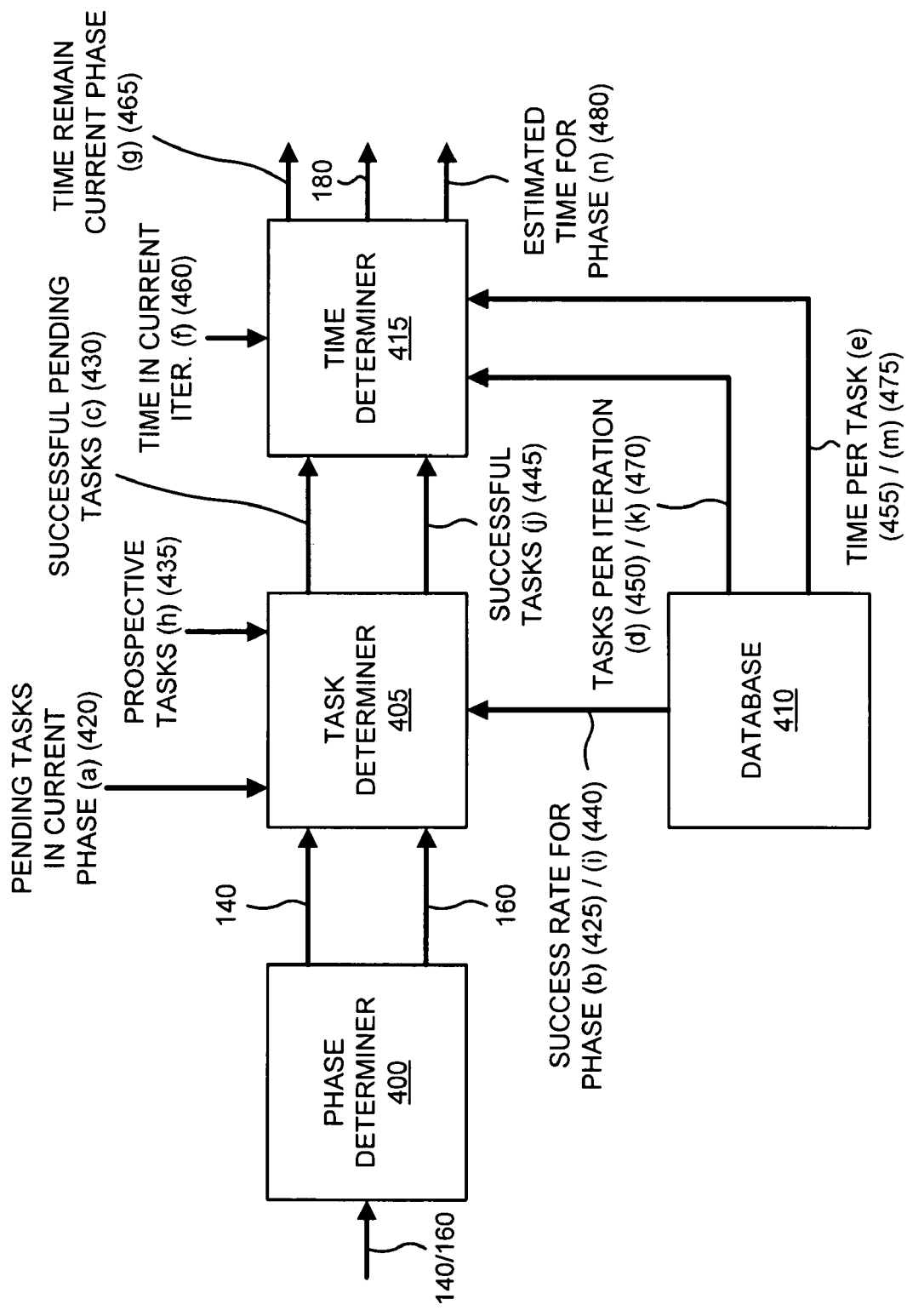
FIG. 4 illustrates a diagram of exemplary functional components of the user device depicted in FIG. 1.

FIG. 4 illustrates a diagram of exemplary functional components of user device 110. As shown, user device 110 may include a phase determiner 400, a task determiner 405, a database 410, and/or a time determiner 415. In one implementation, the functions described in connection with FIG. 4 may be performed by processing unit 220 (FIG. 2), and may provide what is referred to herein as process completion time estimator application 320 (FIG. 3).

Phase determiner 400 may include any hardware or combination of hardware and software that may receive information associated with phases (e.g., first phase 140 and second phase 160) of a process (e.g., process 130), and may determine whether each of the phases is a currently executing phase of the process or a next phase of the process. For example, phase determiner 400 may determine that first phase 140 is a currently executing phase of process 130, and that second phase 160 is a next phase of process 130 (e.g., a non-executing phase of process 130). Phase determiner 400 may provide information associated with first phase 140 and/or information associated with second phase 160 to task determiner 405. In another example, if a process includes five phases (e.g., A, B, C, D, and E) and phase B is currently executing, phase determiner 400 may determine that phase B is a currently executing phase of the process and that phases C, D, and E are next phases of the process. User device 110 may calculate estimated time (t) 180 based on a time estimate for phase B, as well as time estimates for phases C, D, and E.

Task determiner 405 may include any hardware or combination of hardware and software that may receive information associated with first phase 140 (e.g., a currently executing phase) and/or information associated with second phase 160 (e.g., a next phase) from phase determiner 400. If task determiner 405 receives information associated with first phase 140, task determiner 405 may obtain a number (a) 420 of pending tasks in the currently executing phase (e.g., first phase 140), may retrieve (e.g., from database 410) a success rate (b) 425 for first phase 140, and may calculate an expected number (c) 430 (e.g., c=a*b) of tasks among the pending tasks that may succeed in first phase 140. If task determiner 405 receives information associated with the next phase (e.g., second phase 160), task determiner 405 may obtain a number (h) 435 of prospective tasks in the next phase (e.g., second phase 160), may retrieve (e.g., from database 410) a success rate (i) 440 for second phase 160, and may calculate an expected number (j) 445 (e.g., j=h*i) of tasks that may succeed in second phase 160. In one implementation, if the next phase (e.g., second phase 160) immediately follows the currently executing phase (e.g., first phase 140), task determiner 405 may determine number (h) 435 of prospective tasks in the next phase to be equal to number (c) 430. If the next phase (e.g., second phase 160) follows an unexecuted phase, task determiner 405 may determine number (h) 435 to be equal to number (j) 445. Task determiner 405 may provide number (c) 430 and/or number (j) 445 to time determiner 415.

Database 410 may include a storage device (e.g., main memory 230, ROM 240, storage device 250, etc.) that may store information received by and/or generated by user device 110. In one implementation, database 410 may store information described below in connection with FIG. 5. For example, database 410 may store task information and/or time information associated with a process (e.g., process 130).

Time determiner 415 may include any hardware or combination of hardware and software that may receive number (c) 430 of tasks among the pending tasks that may succeed in first phase 140 and/or number (j) 445 of tasks that may succeed in second phase 160 from task determiner 405. If time determiner 415 receives number (c) 430 of tasks among the pending tasks that may succeed in first phase 140, time determiner 415 may retrieve (e.g., from database 410) a number (d) 450 of tasks per iteration (i.e., a number of tasks that can execute concurrently) in first phase 140, may retrieve (e.g., from database 410) an expected time (e) 455 per successful task in first phase 140, may obtain an elapsed time (f) 460 in a current iteration, and may calculate a remaining time (g) 465 (e.g., g=(c/d)*e−f) for first phase 140. If time determiner 415 receives number (j) 445 of tasks that may succeed in second phase 160, time determiner 415 may retrieve (e.g., from database 410) a number (k) 470 of tasks per iteration (i.e., a number of tasks that can execute concurrently) in second phase 160, may retrieve (e.g., from database 410) an expected time (m) 475 per task in second phase 160, and may calculate an estimated time (n) 480 (e.g., n=(j/k)*m) for second phase 160.

As further shown in FIG. 4, time determiner 415 may calculate estimated time (t) 180 remaining for completion of process 130 based on remaining time (g) 465 and/or estimated time (n) 480. For example, time determiner 415 may set estimated time (t) 180 to an initial value (e.g., t=0), and may add remaining time (g) 465 to the initial estimated time (t) 180 (e.g., t=t+g) to obtain an updated estimated time (t) 180. In another example, time determiner 415 may add estimated time (n) 480 to the initial estimated time (t) 180 (e.g., t=t+n) to obtain an updated estimated time (t) 180. Time determiner 415 may provide estimated time 180, remaining time (g) 465, and/or estimated time (n) 480 to user 120 (e.g., via a display associated with user device 110).

User device 110 may periodically perform the aforementioned functions to calculate the time remaining for process 130 to complete. When performing these functions, user device 110 may assume that each task within a particular phase of process 130 will take the same amount of time to succeed. User device 110 may assume that this time is a maximum time that a task takes to succeed. By assuming the maximum possible time, user device 110 may ensure that estimated time (t) 180 monotonically decreases (e.g., and does not increase) as time elapses. Furthermore, if a task fails to complete within the maximum expected time, user device 110 may determine that such a task has failed and may no longer track the failed task.

One factor considered by user device 110 is a time elapsed in a current iteration within the currently executing phase. An iteration may be described by the following example. If there are ten concurrent threads to execute tasks within a phase, then ten tasks may be executed concurrently in each iteration. Within each phase, as tasks complete, the number of tasks that have completed may be monitored by user device 110. From the above example, when ten tasks are completed, it may mean that a first iteration is completed and that a second iteration is being executed. When twenty tasks are completed, it may mean that the second iteration is completed and that a third iteration is being executed. If the time elapsed within a current iteration is not considered, then during the duration of that iteration the time estimated for the currently executing phase may not change and the time estimate may be incorrect.

Furthermore, when performing the aforementioned functions, user device 110 may assume that each phase of process 130 is completely executed prior to execution of the next phase of process 130. Thus, tasks may not be concurrently executed in more than one phase of process 130 at a time. Rather, tasks may be executed in the same phase of process 130 at any given point in time.

Although FIG. 4 shows exemplary functional components of user device 110, in other implementations, user device 110 may contain fewer, different, differently arranged, or additional functional components than depicted in FIG. 4. In still other implementations, one or more functional components of user device 110 may perform one or more other tasks described as being performed by one or more other functional components of user device 110.

Exemplary Database

FIG. 5 depicts a diagram of a portion 500 of an exemplary database capable of being provided in and/or generated by user device 110. As illustrated, database portion 500 may include a process phase field 510, an expected success rate for phase field 520, a number of tasks per iteration field 530, a time expected per successful task field 540, and entries 550 associated with fields 510-540.

Process phase field 510 may include information identifying phases of a process (e.g., process 130). For example, process phase field 510 may include entries 550 for first phase 140 (e.g., "1") of process 130, second phase 160 (e.g., "2") of process 130, a third phase (e.g., "3") of process 130, etc. Process phase field 510 may also include information associated with phases of a process, such as whether a phase is a currently executing phase of the process, whether a phase is a next phase in the process, etc.

Expected success rate for phase field 520 may include success rates associated with the phases provided in process phase field 510. For example, expected success rate for phase field 520 may include an entry 550 (e.g., "0.04") for first phase 140 of process 130 (e.g., identified in process phase field 510), an entry 550 (e.g., "0.10") for second phase 160 of process 130 (e.g., identified in process phase field 510), and an entry 550 (e.g., "0.50") for the third phase of process 130 (e.g., identified in process phase field 510). Success rates of "0.04," "0.10," and "0.50" may indicate that a phase is successful four, ten, and fifty percent, respectively, of the time. In one implementation, entries 550 in expected success rate for phase field 520 may correspond to success rate (b) 425 and/or success rate (i) 440, described above in connection with FIG. 4.

Number of tasks per iteration field 530 may include the number of tasks per iteration associated with the phases provided in process phase field 510. For example, number of tasks per iteration field 530 may include an entry 550 (e.g., "10") for first phase 140 of process 130 (e.g., identified in process phase field 510), an entry 550 (e.g., "15") for second phase 160 of process 130 (e.g., identified in process phase field 510), and an entry 550 (e.g., "20") for the third phase of process 130 (e.g., identified in process phase field 510). Tasks per iteration of "10," "15," and "20" may indicate that a phase includes ten, fifteen, and twenty, respectively, tasks per iteration. In one implementation, entries 550 in number of tasks per iteration field 530 may correspond to number (d) 450 of tasks per iteration and/or number (k) 470 of tasks per iteration, described above in connection with FIG. 4.

Time expected per successful field 540 may include times expected per successful tasks associated with the phases provided in process phase field 510. For example, time expected per successful field 540 may include an entry 550 (e.g., "5 seconds") for first phase 140 of process 130 (e.g., identified in process phase field 510), an entry 550 (e.g., "2 minutes") for second phase 160 of process 130 (e.g., identified in process phase field 510), and an entry 550 (e.g., "20 seconds") for the third phase of process 130 (e.g., identified in process phase field 510). In one implementation, entries 550 in time expected per successful field 540 may correspond to expected time (e) 455 per successful task and/or expected time (m) 475 per task, described above in connection with FIG. 4.

Although FIG. 5 shows exemplary information that may be provided in database portion 500, in other implementations, database portion 500 may contain fewer, different, or additional information than depicted in FIG. 5.

Exemplary User Interface

Figure 6:
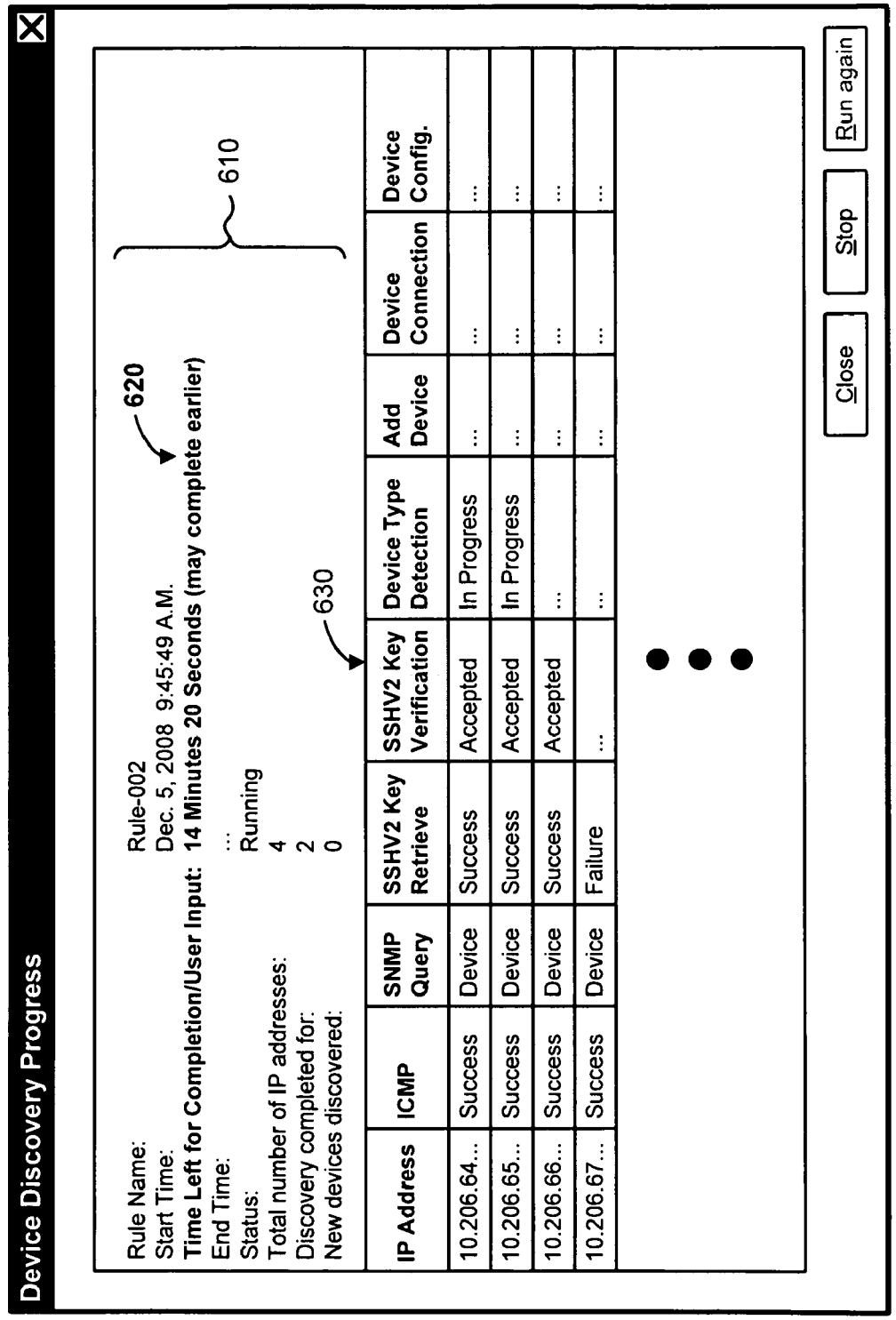
FIG. 6 illustrates a diagram of an exemplary user interface capable of being generated by the user device depicted in FIG. 1.

FIG. 6 illustrates a diagram of an exemplary user interface 600 capable of being generated by user device 110. User interface 600 may include a graphical user interface (GUI) or a non-graphical user interface, such as a text-based interface, and may provide information to users (e.g., user 120) via a customized interface (e.g., a proprietary interface) and/or other types of interfaces (e.g., a browser-based interface). User interface 600 may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. User interface 600 may be displayed to a user via one or more output devices (e.g., output device 270).

As illustrated in FIG. 6, user interface 600 may relate to a device discovery process, and may include a process information section 610 (e.g., that includes information 620 regarding time remaining for completion of the device discovery process) and a phase information section 630. In one example, the device discovery process may include multiple sequential phases, such as a ping phase, a SNMP query phase, a secure shell (SSH) protocol (e.g., a network protocol that allows data to be exchanged using a secure channel between two networked devices) fingerprint retrieval phase, a SSH protocol login phase, a device detection phase, a device addition phase, a device outbound connection phase, a device configuration phase, etc.

Information section 610 may include status information associated with the device discovery process. For example, as shown in FIG. 6, information section 610 may include a rule name associated with the device discovery process (e.g., a rule defining how to perform each phase of the device discovery process); a start time (e.g., "Dec. 5, 2008 9:45:49 A.M.") of the device discovery process; an end time (e.g., unknown since the device discovery process is still executing) of the device discovery process; execution status information (e.g., "Running") associated with the device discovery process; a total number of IP addresses (e.g., "4") to be analyzed by the device discovery process; a number of IP address (e.g., "2") that have been analyzed by the device discovery process; a number of new devices (e.g., "0") discovered by the device discovery process, etc.

Information 620 may include a time (e.g., "14 Minutes 20 Seconds") remaining for completion of the device discovery process. This may indicate that the device discovery process still requires (e.g., at a maximum) fourteen minutes and twenty seconds in order to complete its analysis of the remaining IP addresses associated with the device discovery process. In one example, information 620 may correspond to estimated time (t) 180 remaining for completion of process 130.

Phase information section 630 may include information associated with each phase of the device discovery process. For example, phase information section 630 may include information associated with IP addresses to be analyzed by the device discovery process, a ping (e.g., "ICMP") phase, a SNMP query phase, a SSH protocol fingerprint retrieval (e.g. "SSHV2 Key Retrieve") phase, a SSH protocol login (e.g., "SSHV2 Key Verification") phase, a device detection (e.g., "Device Type Detection") phase, a device addition (e.g., "Add Device") phase, a device outbound connection phase, a device configuration phase, etc. associated with the device discovery process. As shown in FIG. 6, each phase of the device discovery process may include four tasks (e.g., a task associated with each of the four IP addresses). For each phase of the device discovery process, a different number of concurrent threads may be used to execute the tasks of the phase. Furthermore, user device 110 may assign a different time duration to an expected time for a task to successfully complete within a phase of the device discovery process, and may assign a different expected success rate to each phase of the device discovery process.

Although user interface 600 depicts a variety of information, in other implementations, user interface 600 may depict fewer, different, differently arranged, or additional information than depicted in FIG. 6. For example, if a process other than a device discovery process is monitored (or executed) by user device 110, user interface 600 may include information associated with the other process.

Exemplary Process

FIGS. 7-11 depict flow charts of an exemplary process 700 for calculating an estimated time remaining for completion of a multi-phased and multi-threaded process according to implementations described herein. In one implementation, process 700 may be performed by user device 110. In another implementation, some or all of process 700 may be performed by another device or group of devices, including or excluding user device 110.

Figure 7:
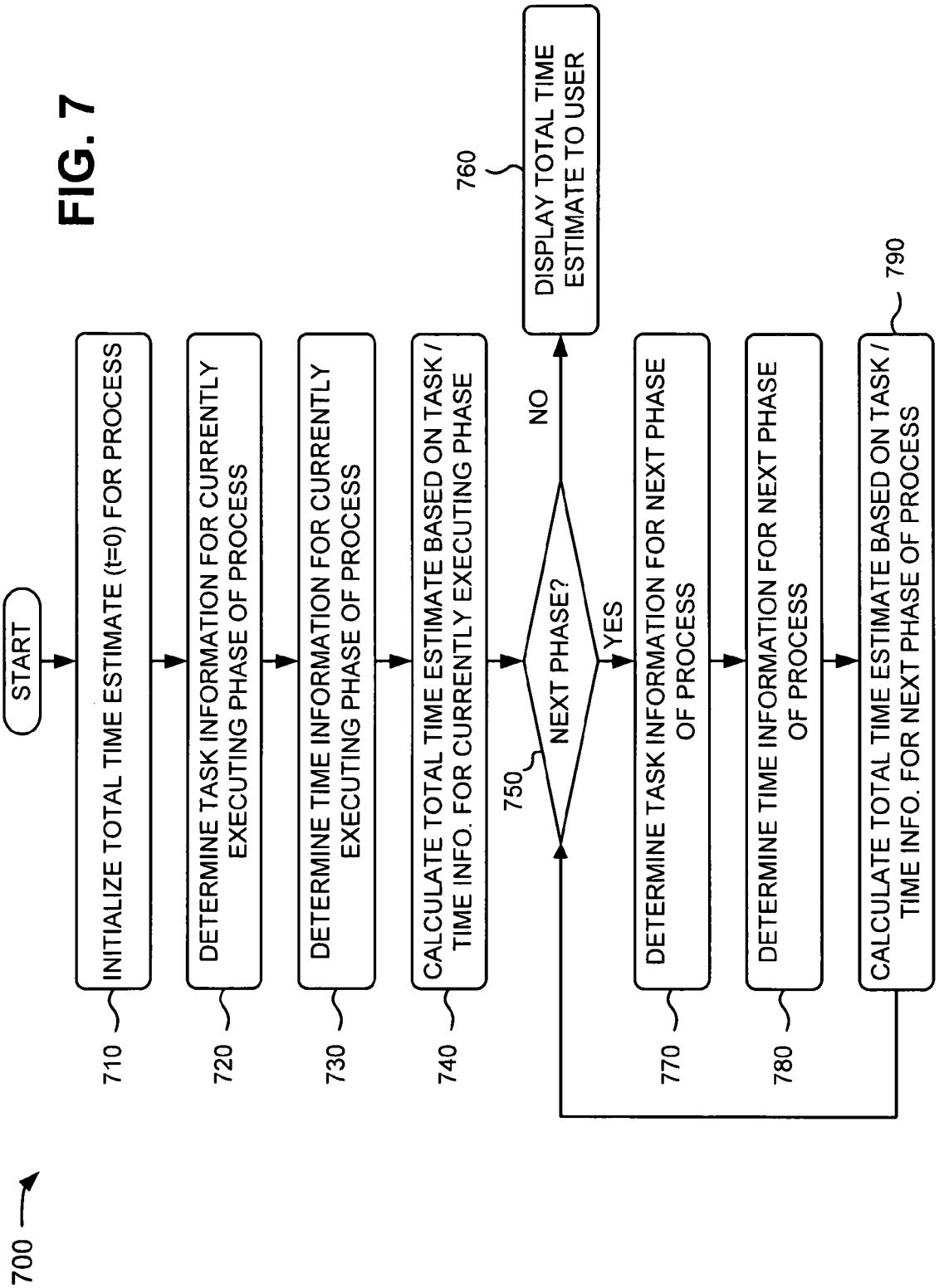
FIGS. 7-11 depict flow charts of an exemplary process for calculating an estimated time remaining for completion of a multi-phased and multi-threaded process according to implementations described herein.

As illustrated in FIG. 7, process 700 may begin with initialization of a total time estimate for a multi-threaded and multi-phased process (block 710), and determination of task information for a currently executing phase of the process (block 720). For example, in implementations described above in connection with FIG. 1, user device 110 may set estimated time (t) 180 to an initial value (e.g., t=0), and may receive and/or determine task information associated with process 130. The task information associated with process 130 may include one or more of a number of pending tasks in a currently executing phase of process 130; an expected success rate for the currently executing phase; an expected number of tasks among the pending tasks that will succeed in the currently executing phase; a number of tasks per iteration (i.e., a number of tasks that can execute concurrently) in the currently executing phase; etc.

As further shown in FIG. 7, time information for the currently executing phase of the process may be determined (block 730), the total time estimate may be calculated based on the task information and/or the time information for the currently executing phase (block 740), and it may be determined whether there is a next phase in the process (block 750). For example, in implementations described above in connection with FIG. 1, user device 110 may receive and/or determine time information associated with a currently executing phase of process 130. The time information associated with the currently executing phase of process 130 may include one or more of an expected time per successful task in the currently executing phase; an elapsed time in a current iteration; a time remaining for the currently executing phase; etc. User device 110 may determine estimated time (t) 180 based on the task information and/or the time information associated with the currently executing phase of process 130. User device 110 may also determine whether there is a next phase of process 130.

Returning to FIG. 7, if there is not a next phase in the process (block 750—NO), the total time estimate may be displayed to a user (block 760). If there is a next phase in the process (block 750—YES), task information for the next phase of the process may be determined (block 770). For example, in implementations described above in connection with FIG. 1, user device 110 may determine if there is a next phase of process 130, and may display estimated time (t) 180 to user 120 if there is no next phase of process 130. If there is a next phase of process 130, user device 110 may receive and/or determine task information associated with the next phase of process 130. The task information associated with the next phase of process 130 may include one or more of a number of prospective tasks in the next phase of process 130; an expected success rate for the next phase; an expected number of tasks that will succeed in the next phase; a number of tasks per iteration (i.e., a number of tasks that can execute concurrently) in the next phase; etc.

As further shown in FIG. 7, time information for the next phase of the process may be determined (block 780), the total time estimate may be calculated based on the task information and/or the time information for the next phase of the process (block 790), and process 700 may return to block 750 (e.g., to determine if there is another phase of the process). Thus, process 700 may continue for all subsequent phases of the process. For example, in implementations described above in connection with FIG. 1, user device 110 may receive and/or determine time information associated with a next phase of process 130. The time information associated with the next phase of process 130 may include one or more of an expected time per task in the next phase; an estimated time for the next phase; etc. If user device 110 determines there is a next phase of process 130, user device 110 may determine estimated time (t) 180 based on the task information and/or the time information associated with the next phase of process 130.

Figure 8:
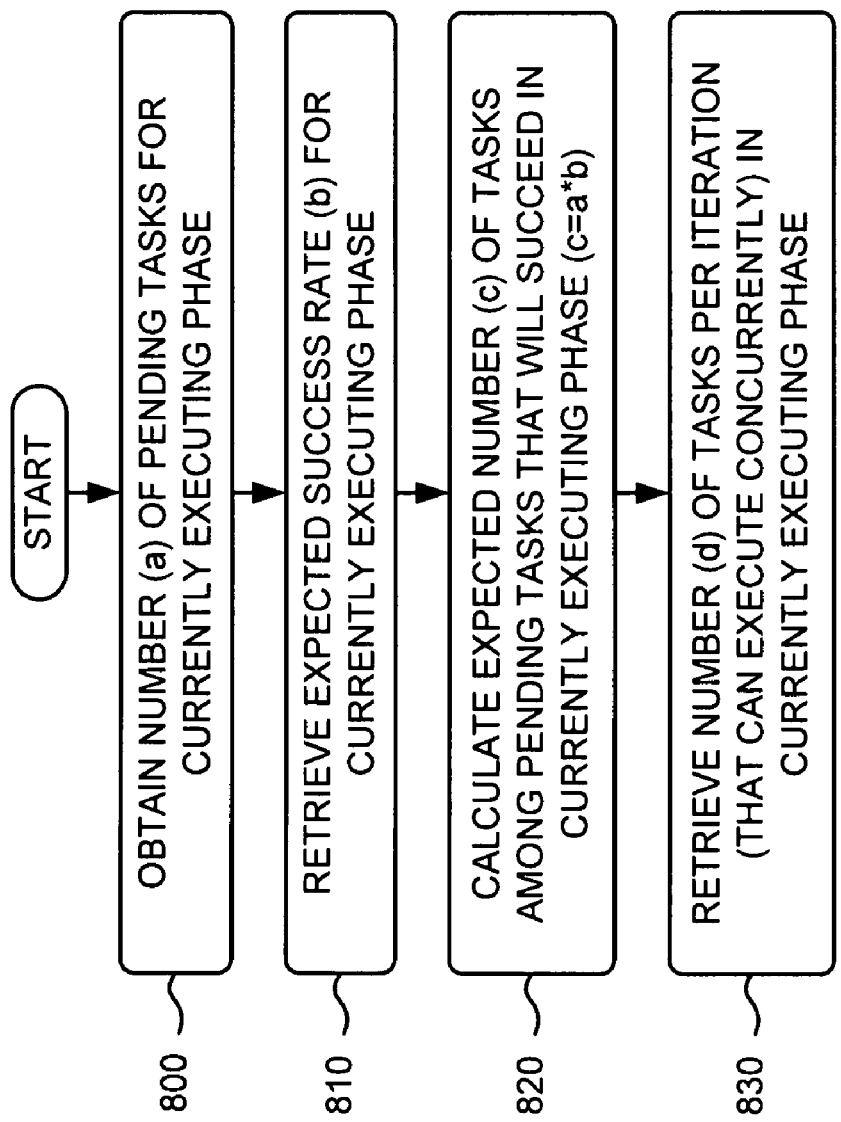

Process block 740 may include the process blocks depicted in FIG. 8. As shown in FIG. 8, process block 740 may include obtaining a number (a) of pending tasks for the currently executing phase (block 800), retrieving an expected success rate (b) for the currently executing phase (block 810), calculating an expected number (c) of tasks among pending tasks that will succeed in the currently executing phase (c=a*b) (block 820), and retrieving a number (d) of tasks per iteration (that can execute concurrently) in the currently executing phase (block 830). For example, in implementations described above in connection with FIG. 4, if task determiner 405 of user device 110 receives information associated with first phase 140, task determiner 405 may obtain number (a) 420 of pending tasks in the currently executing phase (e.g., first phase 140), may retrieve (e.g., from database 410) success rate (b) 425 for first phase 140, and may calculate expected number (c) 430 (e.g., c=a*b) of tasks among the pending tasks that may succeed in first phase 140. If time determiner 415 of user device 110 receives number (c) 430 of tasks among the pending tasks that may succeed in first phase 140, time determiner 415 may retrieve (e.g., from database 410) number (d) 450 of tasks per iteration (i.e., a number of tasks that can execute concurrently) in first phase 140.

Figure 9:
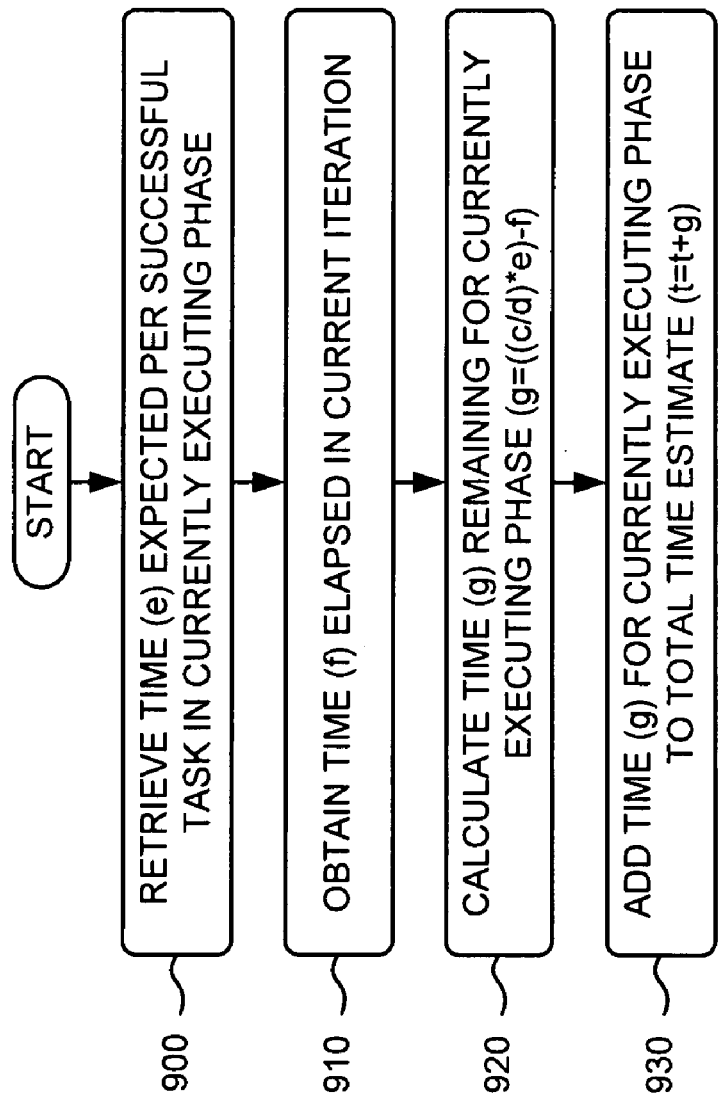

Process blocks 730/740 may include the process blocks depicted in FIG. 9. As shown in FIG. 9, process blocks 730/740 may include retrieving a time (e) expected per successful task in the currently executing phase (block 900), obtaining a time (f) elapsed in a current iteration (block 910), calculating a time (g) remaining for the currently executing phase (g=((c/d)*e)−f) (block 920), and adding the time (g) for the currently executing phase to the total time estimate (t=t+g) (block 930). For example, in implementations described above in connection with FIG. 4, if time determiner 415 of user device 110 receives number (c) 430 of tasks among the pending tasks that may succeed in first phase 140, time determiner 415 may retrieve (e.g., from database 410) expected time (e) 455 per successful task in first phase 140, may obtain elapsed time (f) 460 in a current iteration, and may calculate remaining time (g) 465 (e.g., g=(c/d)*e−f) for first phase 140. Time determiner 415 may add remaining time (g) 465 to the initial estimated time (t) 180 (e.g., t=t+g) to obtain an updated estimated time (t) 180.

Figure 10:
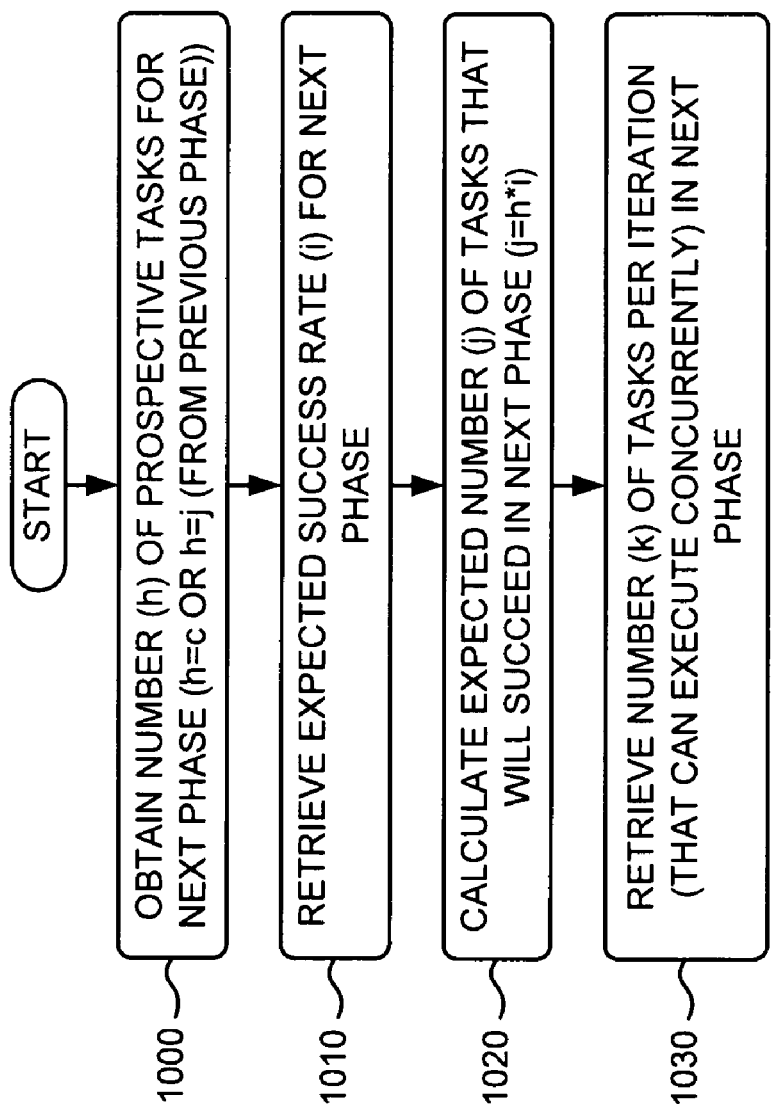

Process block 770 may include the process blocks depicted in FIG. 10. As shown in FIG. 10, process block 770 may include obtaining a number (h) of prospective tasks for the next phase (block 1000), retrieving an expected success rate (i) for the next phase (block 1010), calculating an expected number (j) of tasks that will succeed in the next phase (j=h*i) (block 1020), and retrieving a number (k) of tasks per iteration (that can execute concurrently) in the next phase (block 1030). For example, in implementations described above in connection with FIG. 4, if task determiner 405 of user device 110 receives information associated with the next phase (e.g., second phase 160), task determiner 405 may obtain number (h) 435 of prospective tasks in the next phase (e.g., second phase 160), may retrieve (e.g., from database 410) success rate (i) 440 for second phase 160, and may calculate expected number (j) 445 (e.g., j=h*i) of tasks that may succeed in second phase 160. In one example, if the next phase (e.g., second phase 160) immediately follows the currently executing phase (e.g., first phase 140), task determiner 405 may determine number (h) 435 of prospective tasks in the next phase to be equal to number (c) 430. If the next phase (e.g., second phase 160) follows an unexecuted phase, task determiner 405 may determine number (h) 435 to be equal to number (j) 445. If time determiner 415 of user device 110 receives number (j) 445 of tasks that may succeed in second phase 160, time determiner 415 may retrieve (e.g., from database 410) number (k) 470 of tasks per iteration (i.e., a number of tasks that can execute concurrently) in second phase 160.

Figure 11:
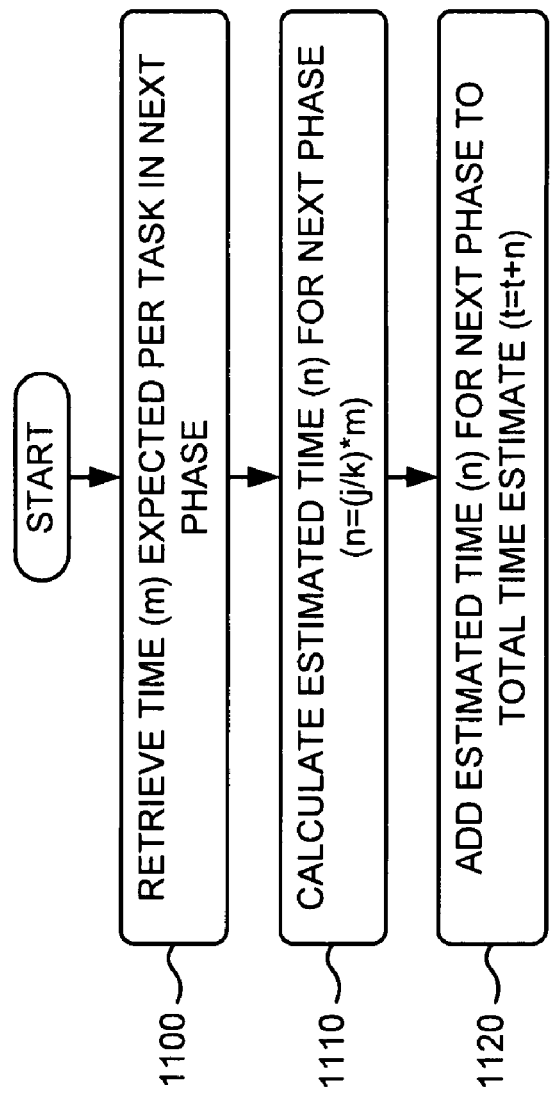

Process blocks 780/790 may include the process blocks depicted in FIG. 11. As shown in FIG. 11, process blocks 780/790 may include retrieving a time (m) expected per task in the next phase (block 1100), calculating an estimated time (n) for the next phase (n=j/k)*m) (block 1110), and adding the estimated time (n) for the next phase to the total time estimate (t=t+n) (block 1120). For example, in implementations described above in connection with FIG. 4, if time determiner 415 of user device 110 receives number (j) 445 of tasks that may succeed in second phase 160, time determiner 415 may retrieve (e.g., from database 410) expected time (m) 475 per task in second phase 160, and may calculate estimated time (n) 480 (e.g., n=(j/k)*m) for second phase 160. Time determiner 415 may add estimated time (n) 480 to the initial estimated time (t) 180 (e.g., t=t+n) to obtain an updated estimated time (t) 180.

CONCLUSION

Systems and/or methods described herein may calculate an estimated time remaining for completion of a multi-phased and multi-threaded process. For example, in one implementation, the systems and/or methods may initialize a total time estimate for a multi-phased and multi-threaded process, and may determine task information and time information for a currently executing phase of the process. The systems and/or methods may calculate the total time estimate based on the task and time information for the currently executing phase, and may determine if the process includes another (or a next) phase. If the process doe not include a next phase, the systems and/or methods may display the total time estimate to a user. If the process includes a next phase, the systems and/or methods may determine task information and time information for the next phase, and may calculate the total time estimate based on the task and time information for the next phase. The systems and/or methods may repeat the aforementioned steps for all subsequent phases of the process.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7-11, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
    one or more processors to:
        initialize a total time estimate for a multi-phased and multi-threaded process,
        determine task information for a currently executing phase of the multi-phased and multi-threaded process,
        the task information for the currently executing phase including:
            a number of pending tasks for the currently executing phase of the multi-phased and multi-threaded process,
            an expected success rate for the currently executing phase of the multi-phased and multi-threaded process,
            an expected number of tasks among the pending tasks that will succeed in the currently executing phase of the multi-phased and multi-threaded process, the expected number of tasks being based on the number of pending tasks for the currently executing phase and the expected success rate for the currently executing phase, and a number of tasks per iteration in the currently executing phase of the multi-phased and multi-threaded process, determine time information for the currently executing phase of the multi-phased and multi-threaded process, calculate an updated total time estimate for the multi-phased and multi-threaded process based on the task information and the time information for the currently executing phase of the multi-phased and multi-threaded process, and present the updated total time estimate for display.

2. The device of claim 1, where the time information for the currently executing phase includes one or more of:

a time expected per successful task in the currently executing phase of the multi-phased and multi-threaded process, a time elapsed in a current iteration of the currently executing phase of the multi-phased and multi-threaded process, or a time remaining for the currently executing phase of the multi-phased and multi-threaded process, the time remaining for the currently executing phased being based on the expected number of tasks among the pending tasks for the currently executing phase, the time expected per successful task for the currently executing phase, and the time elapsed in the current iteration for the currently executing phase.

3. The device of claim 2, where, when calculating the updated total time estimate for the multi-phased and multi-threaded process, the one or more processors are to:

calculate the updated total time estimate by adding the time remaining for the currently executing phase of the multi-phased and multi-threaded process and the total time estimate.

4. The device of claim 1, where the one or more processors are further to:

determine that the multi-phased and multi-threaded process includes a next phase, determine task information for the next phase of the multi-phased and multi-threaded process, determine time information for the next phase of the multi-phased and multi-threaded process, calculate a further updated total time estimate for the multi-phased and multi-threaded process based on the task information for the next phase of the multi-phased and multi-threaded process and the time information for the next phase of the multi-phased and multi-threaded process, and present the further updated total time estimate for display.

5. The device of claim 4, where the task information for the next phase includes:

a number of prospective tasks for the next phase of the multi-phased and multi-threaded process, an expected success rate for the next phase of the multi-phased and multi-threaded process, an expected number of tasks that will succeed in the next phase of the multi-phased and multi-threaded process, the expected number of tasks that will succeed in the next phase being based on the number of prospective tasks for the next phase and the expected success rate for the next phase, and a number of tasks per iteration in the next phase of the multi-phased and multi-threaded process.

6. The device of claim 5, where the time information for the next phase includes:

a time expected per task in the next phase of the multi-phased and multi-threaded process, and an estimated time for the next phase of the multi-phased and multi-threaded process, the estimated time for the next phase being based on the expected number of tasks that will succeed in the next phase, the number of tasks per iteration in the next phase, and the time expected per task in the next phase.

7. The device of claim 6, where, when calculating the further updated total time estimate for the multi-phased and multi-threaded process, the one or more processors are to:

calculate the further updated total time estimate by adding the estimated time for the next phase of the multi-phased and multi-threaded process and the total time estimate.

8. The device of claim 1, where the device comprises one or more of:

a radiotelephone, a personal communications system (PCS) terminal, a personal digital assistant (PDA), a laptop computer, a personal computer, or a network device.

9. A non-transitory computer-readable memory device that stores computer-executable instructions, the computer-executable instructions comprising:

one or more instructions which, when executed by a processor, cause the processor to initialize a total time estimate for a multi-phased and multi-threaded process, one or more instructions which, when executed by the processor, cause the processor to determine task information for a currently executing phase of the multi-phased and multi-threaded process, the task information for the currently executing phase including:

a number of pending tasks in the currently executing phase of the multi-phased and multi-threaded process, and an expected success rate for the currently executing phase of the multi-phased and multi-threaded process, an expected number of tasks among the pending tasks that will succeed in the currently executing phase of the multi-phased and multi-threaded process, the expected number of tasks being based the number of pending tasks for the currently executing phase and the expected success rate for the currently executing phase, and a number of tasks per iteration in the currently executing phase of the multi-phased and multi-threaded process, one or more instructions which, when executed by the processor, cause the processor to determine time information for the currently executing phase of the multi-phased and multi-threaded process, one or more instructions which, when executed by the processor, cause the processor to calculate an updated total time estimate for the multi-phased and multi-threaded process based on the task information and the time information for the currently executing phase of the multi-phased and multi-threaded process, and one or more instructions which, when executed by the processor, cause the processor to cause the updated total time estimate to be displayed.

10. The non-transitory computer-readable memory device of claim 9, where the time information for the currently executing phase comprises one or more of:
   an expected time per successful task in the currently executing phase of the multi-phased and multi-threaded process,
   an elapsed time in a current iteration of the currently executing phase of the multi-phased and multi-threaded process, or
   a time remaining for the currently executing phase of the multi-phased and multi-threaded process.

11. The non-transitory computer-readable memory device of claim 9, where the time information for the currently executing phase includes:
   a time expected per successful task in the currently executing phase of the multi-phased and multi-threaded process,
   a time elapsed in a current iteration of the currently executing phase of the multi-phased and multi-threaded process, and
   a time remaining for the currently executing phase of the multi-phased and multi-threaded process,
      the time remaining for the currently executing phased being based on the expected number of tasks among the pending tasks for the currently executing phase, the time expected per successful task for the currently executing phase, and the time elapsed in the current iteration for the currently executing phase.

12. The non-transitory computer-readable memory device of claim 11, where the one or more instructions to calculate the updated total time estimate for the multi-phased and multi-threaded process comprise:
   one or more instructions to calculate the updated total time estimate by adding the time remaining for the currently executing phase of the multi-phased and multi-threaded process and the total time estimate.

13. The non-transitory computer-readable memory device of claim 9, further comprising:
   one or more instructions to determine that the multi-phased and multi-threaded process includes a next phase,
   one or more instructions to determine task information for the next phase of the multi-phased and multi-threaded process,
   one or more instructions to determine time information for the next phase of the multi-phased and multi-threaded process,
   one or more instructions to calculate a further updated total time estimate for the multi-phased and multi-threaded process based on the task information for the next phase and the time information for the next phase, and
   one or more instructions to cause the further updated total time estimate to be displayed.

14. The non-transitory computer-readable memory device of claim 13, where the task information for the next phase of the multi-phased and multi-threaded process comprises one or more of:
   a number of prospective tasks in the next phase of the multi-phased and multi-threaded process,
   an expected success rate for the next phase of the multi-phased and multi-threaded process,
   an expected number of tasks that will succeed in the next phase of the multi-phased and multi-threaded process, or
   a number of tasks per iteration in the next phase of the multi-phased and multi-threaded process.

15. The non-transitory computer-readable memory device of claim 13, where the task information for the next phase includes:
   a number of prospective tasks for the next phase of the multi-phased and multi-threaded process,
   an expected success rate for the next phase of the multi-phased and multi-threaded process,
   an expected number of tasks that will succeed in the next phase of the multi-phased and multi-threaded process,
      the expected number of tasks that will succeed in the next phased being based on the number of prospective tasks for the next phase and the expected success rate for the next phase, and
   a number of tasks per iteration in the next phase of the multi-phased and multi-threaded process.

16. The non-transitory computer-readable memory device of claim 15, where the time information for the next phase includes:
   a time expected per task in the next phase of the multi-phased and multi-threaded process, and
   an estimated time for the next phase of the multi-phased and multi-threaded process,
      the estimated time for the next phase being based on the expected number of tasks that will succeed in the next phase, the number of tasks per iteration in the next phase, and the time expected per task in the next phase.

17. The computer-readable memory device of claim 16, where the one or more instructions to calculate the further updated total time estimate for the multi-phased and multi-threaded process include:
   one or more instructions to calculate the further updated total time estimate by adding the estimated time for the next phase of the multi-phased and multi-threaded process and the total time estimate.

18. A method comprising:
   initializing, by a computing device, a total time estimate for a multi-phased and multi-threaded process;
   determining, by the computing device, task information for a currently executing phase of the multi-phased and multi-threaded process;
      the task information including:
         a number of pending tasks for the currently executing phase of the multi-phased and multi-threaded process,
         an expected success rate for the currently executing phase of the multi-phased and multi-threaded process, and
         an expected number of tasks among the pending tasks that will succeed in the currently executing phase of the multi-phased and multi-threaded process,
            the expected number of tasks being based on the number of pending tasks for the currently executing phase and the expected success rate for the currently executing phase,
   determining, by the computing device, time information for the currently executing phase of the multi-phased and multi-threaded process;
   calculating, by the computing device, an updated total time estimate for the multi-phased and multi-threaded process based on the task information and the time information for the currently executing phase of the multi-phased and multi-threaded process; and
   presenting, by the computing device, the updated total time estimate for display.

19. The method of claim 18, where the time information for the currently executing phase includes:
- a time expected per successful task in the currently executing phase of the multi-phased and multi-threaded process,
- a time elapsed in a current iteration of the currently executing phase of the multi-phased and multi-threaded process, and
- a time remaining for the currently executing phase of the multi-phased and multi-threaded process,
  - the time remaining for the currently executing phased being based on the expected number of tasks among the pending tasks for the currently executing phase, the time expected per successful task for the currently executing phase, and the time elapsed in the current iteration for the currently executing phase; and
- where calculating the updated total time estimate for the multi-phased and multi-threaded process includes:
  - calculating the updated total time estimate by adding, via the processor, the time remaining for the currently executing phase of the multi-phased and multi-threaded process and the total time estimate.

20. The method of claim 18, further comprising:
- determining that the multi-phased and multi-threaded process includes a next phase;
- determining time information for the next phase;
- determining task information for the next phase,
  - the task information for the next phase including:
    - a number of prospective tasks for the next phase of the multi-phased and multi-threaded process,
    - an expected success rate for the next phase of the multi-phased and multi-threaded process,
    - an expected number of tasks that will succeed in the next phase of the multi-phased and multi-threaded process, and
    - a number of tasks per iteration in the next phase of the multi-phased and multi-threaded process;
- calculating the further updated total time estimate for the next phase based on the time information for the next phase and the task information for the next phase; and
- presenting the further updated total time estimate for display.

21. The method of claim 20,
where the time information for the next phase includes:
- a time expected per task in the next phase of the multi-phased and multi-threaded process, and
- an estimated time for the next phase of the multi-phased and multi-threaded process; and
where calculating the further updated total time estimate for the multi-phased and multi-threaded process includes:
- calculating the further updated total time estimate by adding the estimated time for the next phase of the multi-phased and multi-threaded process and the total time estimate.

22. A system comprising:
one or more processors to:
- initialize a total time estimate for a multi-phased and multi-threaded process;
- determine task information for a currently executing phase of the multi-phased and multi-threaded process,
  - the task information for the currently executing phase including:
    - a quantity of pending tasks for the currently executing phase of the multi-phased and multi-threaded process,
    - an expected success rate for the currently executing phase of the multi-phased and multi-threaded process, and
    - an expected number of tasks among the pending tasks that will succeed in the currently executing phase of the multi-phased and multi-threaded process,
      - the expected number of tasks being based on the quantity of pending tasks for the currently executing phase and the expected success rate for the currently executing phase;
- determine time information for the currently executing phase of the multi-phased and multi-threaded process;
- calculate an updated total time estimate for the multi-phased and multi-threaded process based on the task information and the time information for the currently executing phase of the process;
- provide the updated total time estimate for display;
- determine that the multi-phased and multi-threaded process includes a next phase;
- determine task information for the next phase of the multi-phased and multi-threaded process;
- determine time information for the next phase of the multi-phased and multi-threaded process;
- calculate a further updated total time estimate for the multi-phased and multi-threaded process based on the task information for the next phase and the time information for the next phase; and
- provide the further updated total time estimate for display.

23. The non-transitory computer-readable memory device of claim 13, where the time information for the next phase comprises one or more of:
- an expected time per task in the next phase of the multi-phased and multi-threaded process, or
- an estimated time for the next phase of the multi-phased and multi-threaded process.

24. The system of claim 22, where the time information for the currently executing phase includes one or more of:
- a time expected per successful task in the currently executing phase of the multi-phased and multi-threaded process,
- a time elapsed in a current iteration of the currently executing phase of the multi-phased and multi-threaded process, or
- a time remaining for the currently executing phase of the multi-phased and multi-threaded process.

25. The system of claim 24, the time remaining for the currently executing phased being based on the expected number of tasks among the pending tasks for the currently executing phase, the time expected per successful task for the currently executing phase, and the time elapsed in the current iteration for the currently executing phase.

26. The system of claim 24, where, when calculating the updated total time estimate for the multi-phased and multi-threaded process, the one or more processors are to:
- calculate the updated total time estimate by adding the time remaining for the currently executing phase of the multi-phased and multi-threaded process and the total time estimate.

* * * * *